Figure 1:
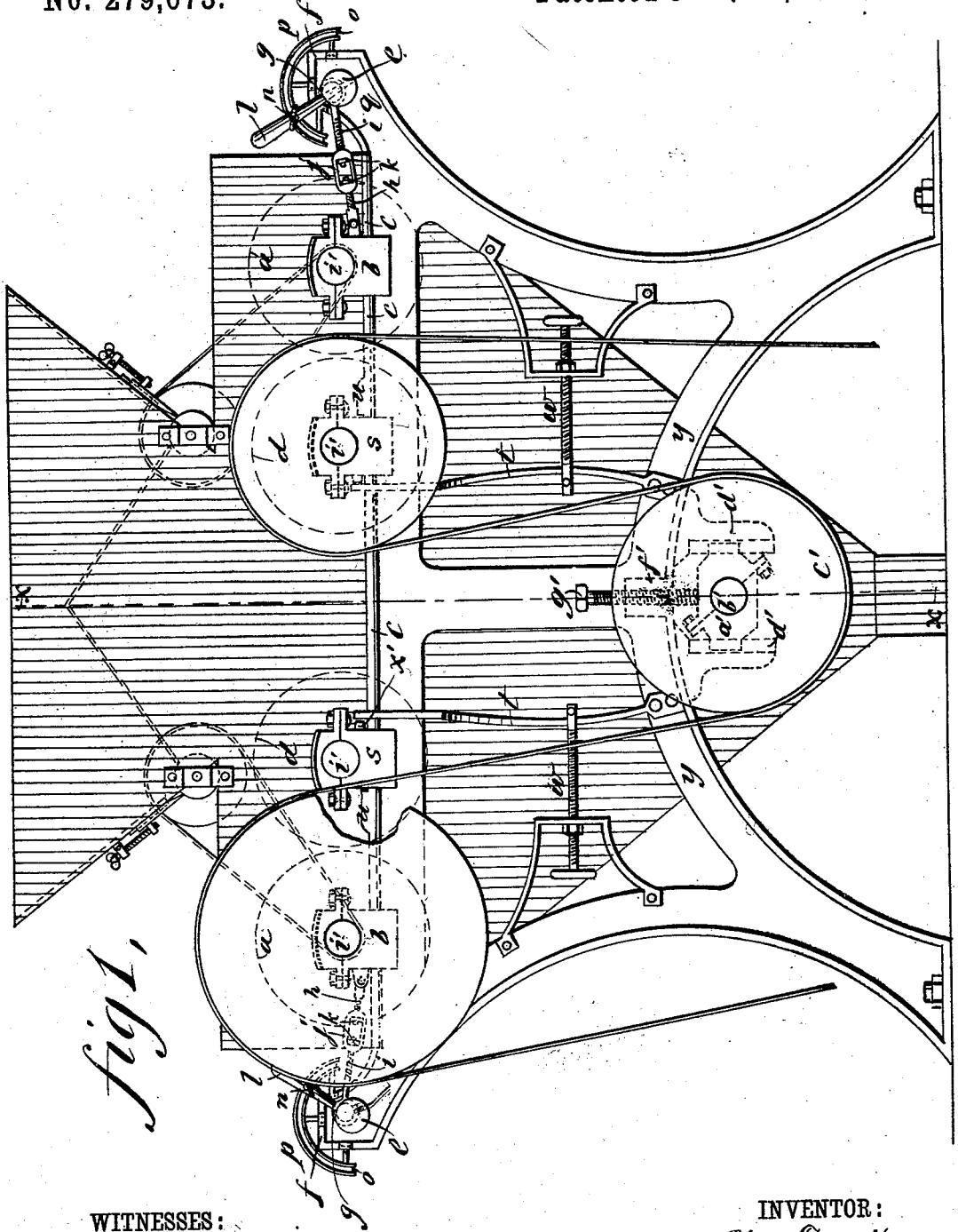

(No Model.)

O. W. TRESSELT.
ROLLER GRAIN MILL.

No. 279,673.

3 Sheets—Sheet 1.

Patented June 19, 1883.

WITNESSES:
Chas. T. Howell,
C. Sedgwick

INVENTOR:
O. W. Tresselt
BY Munn & Co
ATTORNEYS.

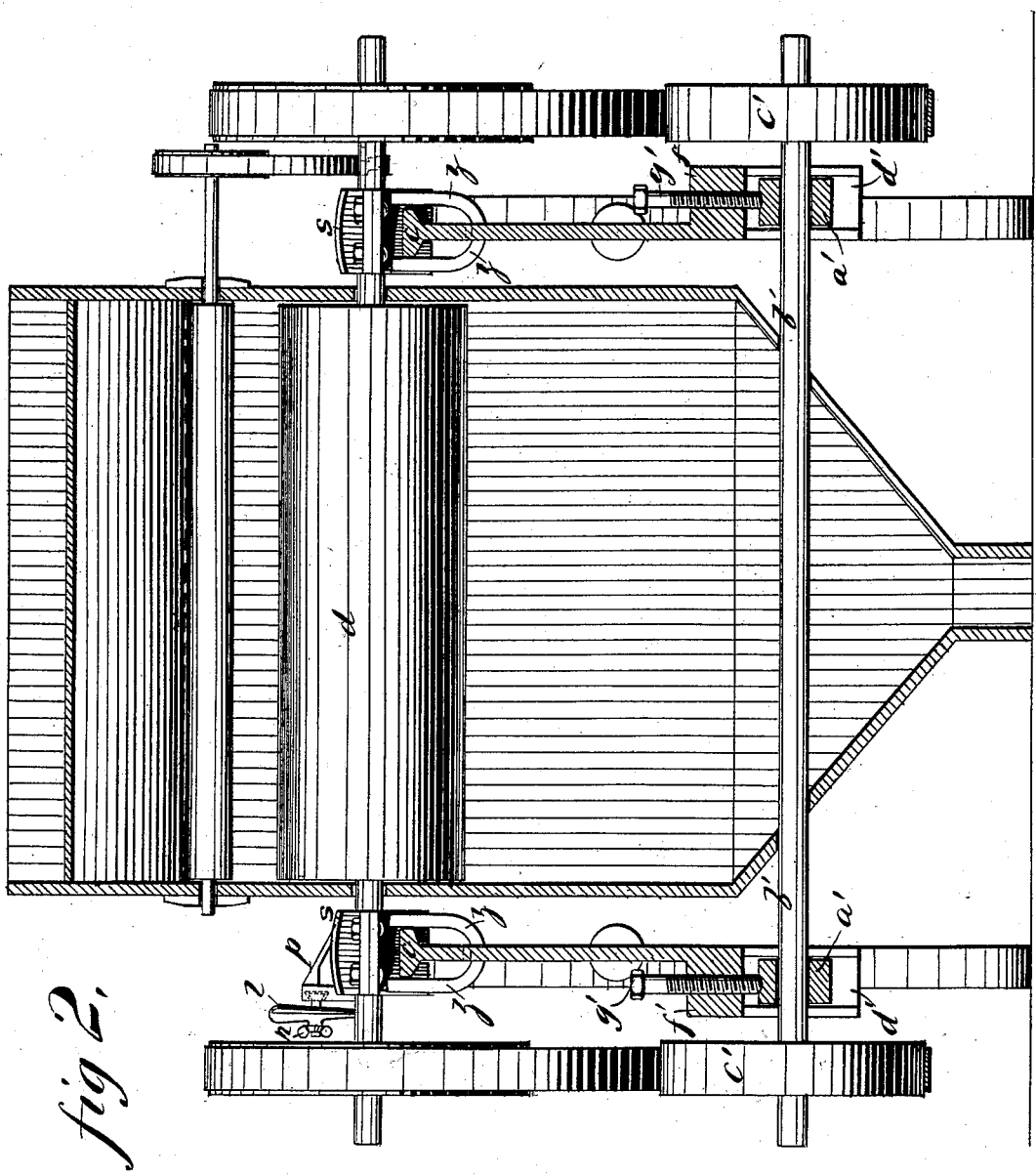

(No Model.)  3 Sheets—Sheet 3.
O. W. TRESSELT.
ROLLER GRAIN MILL.
No. 279,673.  Patented June 19, 1883.
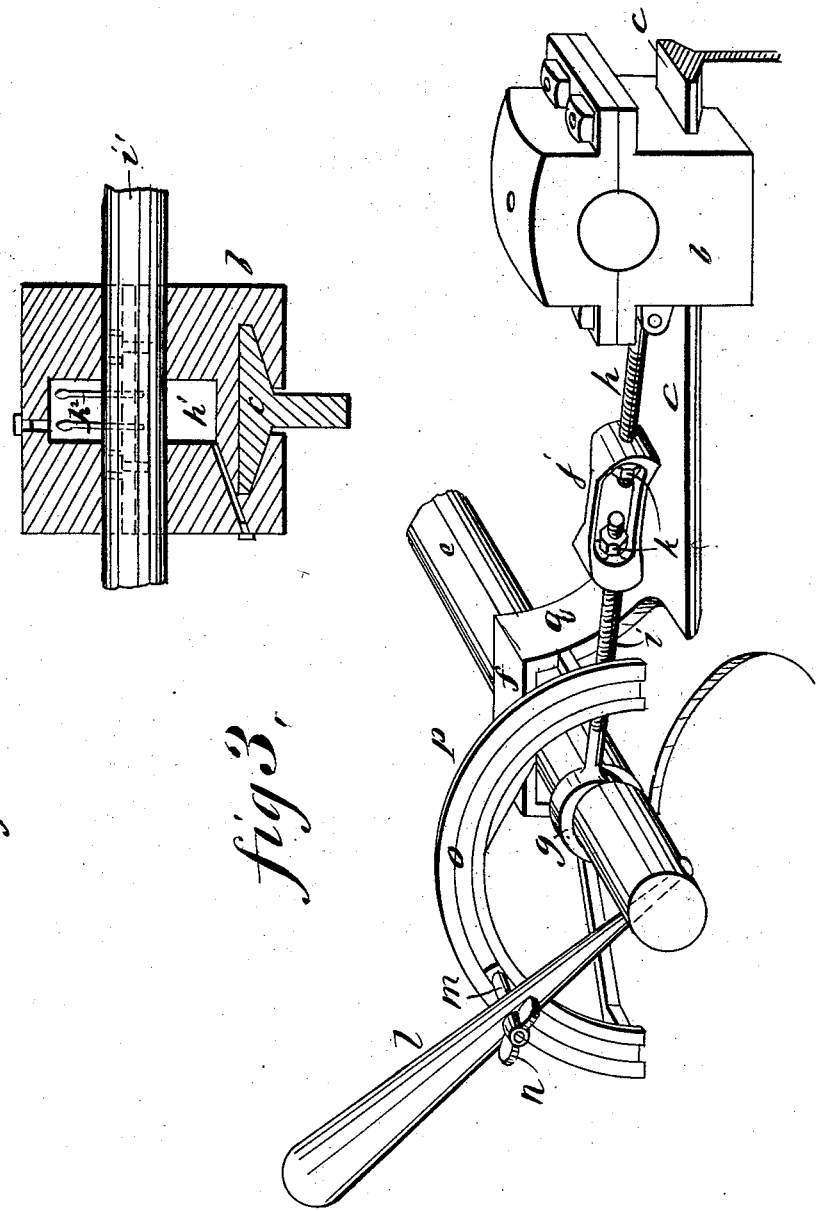
WITNESSES:
Chas. T. Howell,
C. Sedgwick
INVENTOR:
O. W. Tresselt
BY Munn & Co.
ATTORNEYS.

UNITED STATES PATENT OFFICE.

OSCAR W. TRESSELT, OF FORT WAYNE, INDIANA.

ROLLER GRAIN-MILL.

SPECIFICATION forming part of Letters Patent No. 279,673, dated June 19, 1883.

Application filed February 17, 1883. (No model.)

*To all whom it may concern:*

Be it known that I, OSCAR W. TRESSELT, of Fort Wayne, in the State of Indiana, have invented Improvements in Roller Grain-Mills, of which the following is a specification.

The invention will first be described in connection with all that is necessary to a full understanding thereof, and then pointed out in the claims.

Figure 1 of the drawings is a side and Fig. 2 a sectional elevation of the roller-mill, the latter on line $x\ x$ of the former. Fig. 3 is a perspective view of the adjusting devices; and Fig. 4, a detail view, in section, of one of the journal-boxes of the rollers.

In the drawings, $a$ represents rollers, with bearings $b$, adjustable on the bed-plates $c$. This enables rollers $a$ to be set parallel to rollers $d$, or shifted to and from said rollers.

$e$ is a shaft having the bearings $f$ and eccentrics $g$, the latter connected by right-and-left screw-rods $h\ i$ and swivel $j$ with the bearings $b$. This allows the connections to be varied in length and the rollers $a$ to be adjusted. The check-nuts $k$ serve to hold the screws to the shackles. These devices enable the rollers $a$ to be adjusted with respect to rollers $d$.

In order to shift the shaft $e$ so as to grind a finer or coarser article, the shifting-lever $l$ is employed. This carries a bolt, $m$, which may be shifted along a dovetail groove, $o$, of a semicircle, $p$, its head being in the groove and adapted to be locked by a nut $n$.

$q$ is an offset in the bed-frame, by which the bearings of shaft $e$ may be set inwardly from bed $c$, so that boxes $b$ may be in line with eccentrics $g$. The shaft $e$ extends from side to side of the machine, so that the rollers $a$ may be adjusted from end to end alike by manipulating the lever $l$. Springs $t$ exert a yielding pressure upon the bearings $s$, so that the rolls $d$ will separate sufficiently to allow matters too hard to be crushed to pass through them. The bearings will be held up to the stop-shoulders $u$ on bed-plates $c$ until the obstruction becomes too great for the springs to resist.

$w$ are adjusting-screws to regulate the tension of the springs, and $x'$ a rib on the bearings $s$, to form a rest for the springs without upward or downward thrust. The springs $t$ are bibranched and extend up on each side of the bed-plates $c$.

The frame is cast with housings $d'$, projecting down from the under side of the cross-bars $y$, with bosses $f'$ for the nuts of the adjusting-screws $g'$, by which the belts may be tightened. The bed-plates $c$ are also planed flat on top, and beveled underneath for the roller-journal bearings, which are also planed correspondingly. I also make oil-boxes in the bearings of the rollers, as shown at $h'$. These devices are not in themselves new, but are described in the interest of a full understanding of the general operation of the machine.

The bearings $b\ s$ are divided, applied to the bed-plates, and bolted together, and the journals $i'$ preferably provided with two spoon-shaped agitators, $h^2$, (see Fig. 4,) revolving with the journals, for throwing the oil against the top of the chamber, so that it will run down on both sides for continuously lubricating said journals. These devices are also in themselves old, and form no part of the present invention.

Having thus described all that is necessary to the understanding of my invention, what I claim as new is—

1. The combination, with the roller-bearings $b$, of the screw-rods $h\ i$, the intermediate swivels, $j$, the check-nuts $k$, and the shaft $e$, the latter provided with eccentrics $g\ g$ and hand-lever $l$, as shown and described.

2. The bearings $s$ and rollers $d$, in combination with the springs $t$, bed-plates $c$, having shoulders $u$, and adjusting-screws $w$, as and for the purpose specified.

3. The combination, with the shaft $e$, eccentrics $g\ g$, screw-rods $h\ i$, swivel $j$, and the bearings $b$ of rollers $a$, of the shifting-lever $l$, the bolt $m$, and the semicircle $p$, provided with a dovetail groove, $o$, in which said bolt's head slides, as described.

OSCAR WILLIAM TRESSELT.

Witnesses:
ROBERT GAVIN,
HERMANN GELLING.